United States Patent [19]

Sekiguchi et al.

[11] Patent Number: 5,531,204
[45] Date of Patent: Jul. 2, 1996

[54] INJECTION TIMING DEVICE FOR FUEL INJECTION SYSTEM

[75] Inventors: Akira Sekiguchi; Yoshinori Uchida, both of Higashimatsuyama, Japan

[73] Assignee: Zexel Corporation, Tokyo, Japan

[21] Appl. No.: 510,536

[22] Filed: Aug. 2, 1995

[30] Foreign Application Priority Data

Aug. 10, 1994 [JP] Japan .................................. 6-209131

[51] Int. Cl.$^6$ .................................................. F02M 59/20
[52] U.S. Cl. ...................... 123/502; 123/501; 123/179.17
[58] Field of Search ..................................... 123/502, 501, 123/357, 494, 179.17, 449

[56] References Cited

U.S. PATENT DOCUMENTS

| | | | |
|---|---|---|---|
| 4,262,645 | 4/1981 | Kobayashi | 123/179.17 |
| 4,397,285 | 9/1983 | O'Neill | 123/502 |
| 4,476,837 | 10/1984 | Salzgeber | 123/502 |
| 4,541,392 | 9/1985 | Ogino | 123/502 |
| 4,557,240 | 12/1985 | Sakuranaka | 123/179.17 |
| 4,572,130 | 2/1986 | Tsukamoto | 123/502 |
| 4,592,327 | 6/1986 | Fujimori | 123/502 |
| 4,658,793 | 4/1987 | Bonin | 123/502 |
| 5,201,297 | 4/1993 | Eblen | 123/502 |
| 5,263,457 | 11/1993 | Konrath | 123/179.17 |

*Primary Examiner*—Carl S. Miller
*Attorney, Agent, or Firm*—Wenderoth, Lind & Ponack

[57] ABSTRACT

In an injection timer for a fuel injection system in which control of the timer shifts from feedback control to open loop control when the engine rotation rate is equal to or less than a specific rotation rate, a decision is made as to whether or not the operation is at startup time and, if it is, decision making for the engine rotation rate is canceled and feedback control is maintained even if the engine rotation rate is equal to or less than the specific rotation rate. Because of this, in a fuel injection system which is capable of maintaining the pump chamber pressure at a high level even at low engine rotation rates, the injection timing device can achieve both an improvement in accuracy of injection timing control and anti-pollution measures at startup. In other words, at startup, since the decision making for whether or not to switch to open loop is not required, a reduction in the accuracy of control due to degradation in the output characteristics of the engine rotation rate sensor is prevented, and since the feedback control area is expanded into the low rotation rate range, anti-pollution measures are facilitated.

20 Claims, 7 Drawing Sheets

INJECTION TIMING DEVICE FOR FUEL INJECTION SYSTEM

BACKGROUND OF THE INVENTION

1. Field of the Invention

The present invention relates to an injection timing device for an electronic control type fuel injection system for controlling the injection start timing of a fuel injection pump.

2. Description of the Related Art

A timer adjusts the injection timing of a distributor type fuel injection pump by, for instance, changing the relative position at which a cam disk that governs the reciprocal movement of plungers comes into contact with a roller, which is supported by a roller holder, to which a timer piston is linked. In recent years, timers have been provided with a high pressure chamber at one end, into which fuel is induced from a chamber which is compressed by a feed pump, and at the other end, a low pressure chamber that communicates with the upstream side of the feed pump and which is provided with a spring. In such a timer, the position of the timer piston is determined by the balance of forces between the pressure of the high pressure chamber, which is adjusted with a timing control valve (TCV), and the spring, which is housed in the low pressure chamber. The position of the timer piston is detected by a timer position sensor which is constituted, for instance, by inserting the front end of a rod connected to the timer piston into a solenoid.

Now, in an injection pump with the pump chamber pressure characteristics indicated with the broken line in FIG. 9, since the pump chamber pressure does not increase under conditions of extremely low engine rotation rates, such as during engine startup, the actual value does not conform to the target value for the timer piston when feedback control of the injection timing is attempted, causing injection timing control to become unstable. Because of this, in current systems, the operation shifts to open loop control when the engine rotation rate is lower than a specific rotation rate (N_IT_OPEN).

However, in order to improve startup characteristics, the recent trend has been toward changing the pump chamber pressure characteristics to those indicated with the solid line in FIG. 9, by increasing the advance angle quantity at startup and also to expand the injection timing control area as a measure against polluting exhaust gases. In an injection pump in which the pump chamber pressure is maintained at a high level even at low rotation rates, if the engine rotation rate becomes equal to or less than N_IT_OPEN at startup and feedback control is canceled, the injection timing control area is actually narrowed, making it difficult to implement anti-pollution measures effectively at startup. Also, if the output characteristics of the sensor that detects the engine rotation rate are inferior, the signal level in the low rotation rate range may be reduced to the point where it is not recognized by the control unit, or, the operation may shift to open loop control even while the rotation rate is sufficient to assure that pump chamber pressure is maintained at a certain level. These factors may result in control accuracy being compromised during the initial stage of running.

SUMMARY OF THE INVENTION

The object of the present invention is to provide an injection timer capable of achieving both an improvement in accuracy of injection timing control and in anti-pollution characteristics at startup and which is also capable of supporting a fuel injection system with the pump chamber pressure characteristics indicated with the solid line in FIG. 9.

Accordingly, the injection timing device for a fuel injection system according to the present invention comprises a timing device that adjusts the fuel injection start timing by causing pressure of the fuel in the pump chamber to work on a timer piston and by adjusting that pressure, a means for timer position detection for detecting the actual position of the timer piston, a means for timer target position setting for setting a target position for the timer piston, a means for feedback control for performing feedback control of the timing device in such a manner that the actual position of the timer piston moves toward the target position, a means for error decision making for determining that an error has occurred in the timing device control system, a means for open loop control for performing open loop control of the timer when the means for error decision making has determined that an error has occurred, a means for startup decision making for determining that the operation is at startup time and a means for control that cancels the decision made by the means for error decision making that an error has occurred, maintaining feedback control when it has been decided by the means for startup decision making that the operation is at startup time.

As a result, during operation at high engine rotation rates, feedback control is performed for the timing device in such a manner that the actual position of the timer piston detected by the means for timer position detection moves toward the target position set by the means for timer target position setting and if it has been decided by the means for error decision making that an error has occurred in the timing device control system, open loop control of the timing device is performed by the means for open loop control. In addition, in an injection pump with the pump chamber pressure characteristics indicated by the solid line in FIG. 9, the pump chamber pressure is high enough to perform feedback control even in the low rotation rate range. As a result, according to the present invention, when it has been decided by the means for startup decision making that the operation is at startup time, the operation does not shift to open loop control of the timer, even when the engine rotation rate is in the extremely low rotation rate range, thereby maintaining feedback control and assuring stable control at the time of startup, thus achieving the object described above.

BRIEF DESCRIPTION OF THE DRAWINGS

These and other advantages, features and objects of the present invention will be understood by those of ordinary skill in the art referring to the annexed drawings, given purely by way of non-limitative example, in which.

DETAILED DESCRIPTION OF THE PREFERRED EMBODIMENT

The following is an explanation of the preferred embodiment according to the present invention in reference to the drawings.

Figure 1:
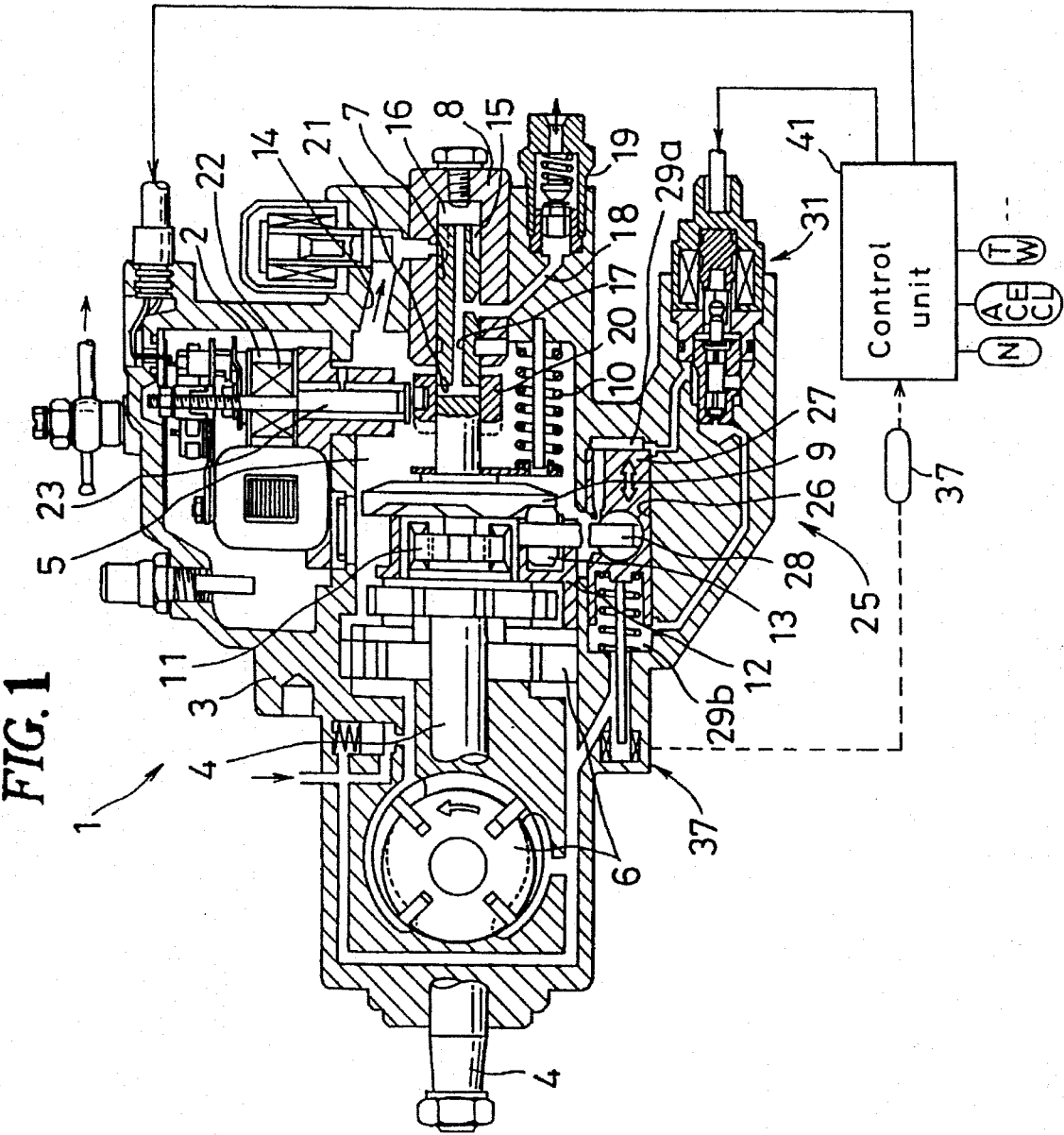
FIG. 1 shows the structure of an example of the fuel injection pump according to the present invention.

In FIG. 1, a distributor type fuel injection pump 1 is provided with a housing 3 that is mounted with an actuator 2, i.e., a so-called electronic governor. At the center of the housing 3, a drive shaft 4 is inserted. One end of the drive shaft 4 projects out to the outside of the housing 3 to receive drive torque from the engine (not shown). The other end of the drive shaft 4 extends to a pump chamber 5 inside the housing 3 and a feed pump 6 is linked to the drive shaft 4 so that fuel from a fuel tank (not shown) is supplied to the pump chamber 5 by the feed pump 6.

A plunger 7 is mounted in a plunger barrel 8 in such a manner that it can slide freely. The base portion of the plunger 7 is pressed into contact with a cam disk 9 by a plunger spring 10. The cam disk 9 is connected to the drive shaft 4 via a coupling 11 in such a manner that it can travel in the direction of the axis. The cam disk 9 is also in contact with a roller 13 that is supported by a roller holder 12 so that the cam disk 9 simultaneously effects reciprocal movement for fuel intake and force feed as well as rotational movement for distributing fuel to the plunger 7.

During the intake process, in which the plunger 7 travels to the left in FIG. 1, the fuel that has been supplied into the pump chamber 5 via an oil transfer pump flows into a compression space 16 that is enclosed by the plunger barrel 8 and the plunger 7 via one of the intake grooves 15 formed in the direction of the shaft of the plunger 7 at its front end, from an intake port 14. During the force feed process, in which the plunger 7 travels to the right in the figure, the intake port 14 becomes separated from the intake groove 15 and the fuel that has been compressed in the compression space 16 travels through a longitudinal hole 17 in the plunger 7 to enter one of the distribution passages 18 from a distribution port. It is then supplied to an injection nozzle (not shown) via a delivery valve 19 to be injected into a cylinder of the engine.

Additionally, a control sleeve 20 is externally fitted on the portion of the plunger 7 that projects out from the plunger barrel 8 in such a manner that it can slide freely, and when a cutoff port 21, which communicates with the longitudinal hole 17 in the plunger 7, passes beyond the edge of the control sleeve 20 to open into the pump chamber 5, the compressed fuel flows out to the pump chamber 5 to stop the delivery of fuel to the injection nozzle, ending the injection. Thus, the injection end, i.e., the injection quantity, can be controlled through positional adjustment of the control sleeve 20. By moving the control sleeve 20 to the left in the figure, the injection quantity is reduced and by moving it to the right, the injection quantity is increased.

The front end of a shaft 23, which is mounted at a rotor 22 of the actuator 2 is connected to the control sleeve 20. The front end of the shaft 23 decenters from the shaft axis and consequently, the actuator 2 can adjust the position of the control sleeve 20 through the rotation of the rotor.

Figure 2:
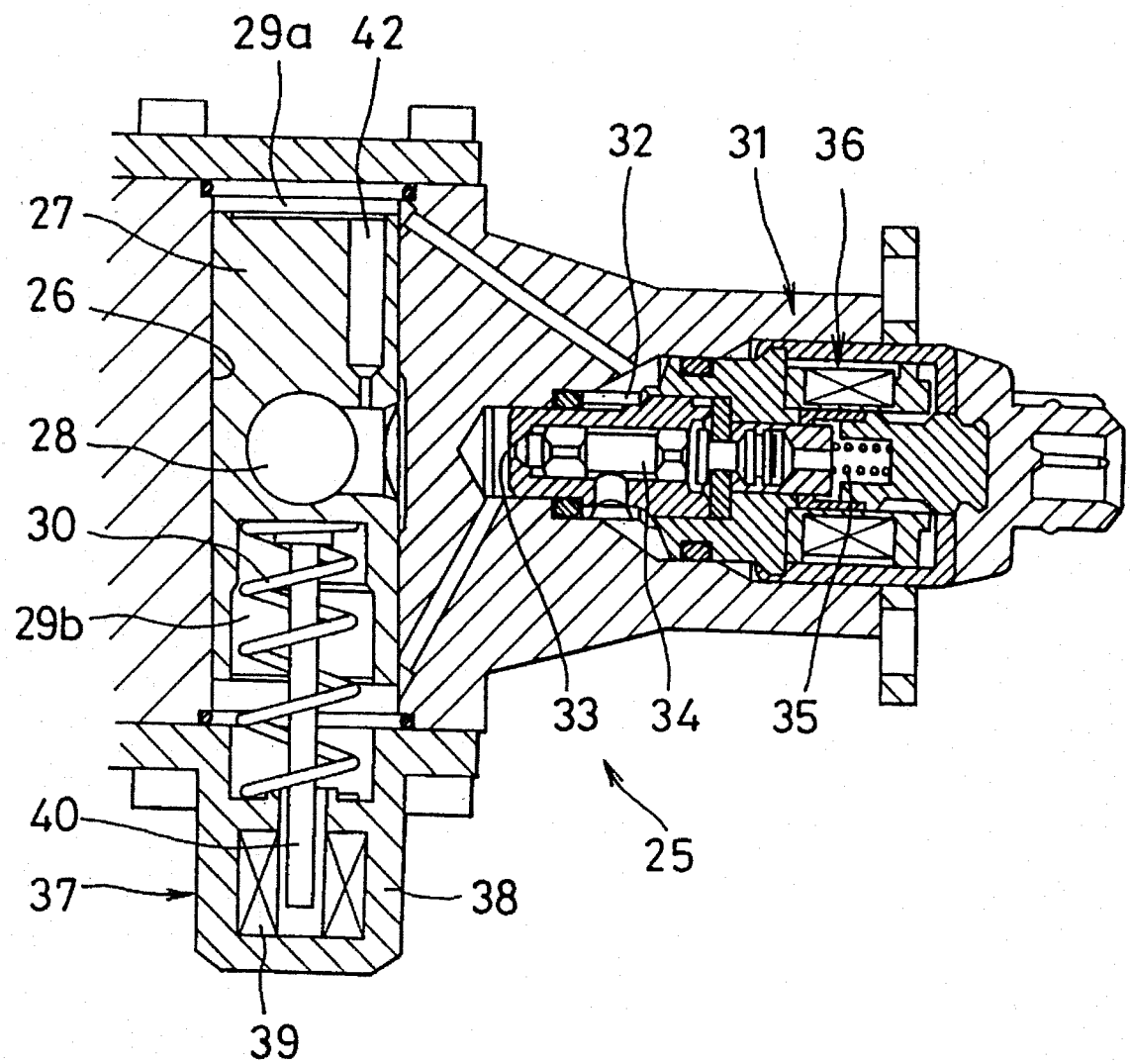
FIG. 2 is an enlarged cross section of the timer of the fuel injection pump according to the present invention.

As shown in FIG. 2, a timing device 25 is provided with a timer piston 27 which is stored in a cylinder 26 located below the roller holder 12 in such a manner that it can slide freely. The timer piston 27 is linked to the roller holder 12 via a lever 28 and, as a result, the injection timing can be adjusted by rotating the roller holder 12 through the sliding motion of the timer piston 27.

At one end of the timer piston 27, a high pressure chamber 29a is formed, into which high pressure fuel is induced from the pump chamber via a constricted passage 42. At the other end, a low pressure chamber 29b is formed, which communicates with the intake path of the feed pump. Furthermore, a timer spring 30 is provided at the low pressure chamber 29b and a constant force is applied to the timer piston 27 toward the high pressure chamber by the timer spring 30. Consequently, the timer piston 27 stops at a position where the spring pressure of the timer spring 30 and the fuel pressure in the high pressure chamber are in balance. When the pressure in the high pressure chamber increases, the timer piston 27 travels toward the low pressure chamber against the force of the timer spring 30 to rotate the roller holder 12 in the direction in which the injection timing is hastened, to advance the injection timing. When the pressure in the high pressure chamber is reduced, the timer piston 27 travels toward the high pressure chamber to rotate the roller holder 12 in the direction in which the injection timing is delayed to retard injection timing.

At this point, the pressure in the high pressure chamber 29a of the timing device 25 is adjusted with a timing control valve (TCV) 31 so that the required timer advance angle can be achieved. This timing control valve 31 is provided with a fuel intake 32 that communicates with the high pressure chamber 29a at the side surface portion and it is also is provided with a fuel outlet 33 that communicates with the low pressure chamber 29b at the front end portion. Inside the timing control valve 31, a needle 34 is housed, which opens and closes the communicating passage between the fuel intake 32 and the fuel outlet 33. A constant force is applied to the needle 34 by a spring 35 in the direction in which communication between the fuel intake 32 and the fuel outlet 33 is cut off. When electricity is supplied to a solenoid 36, the needle 34 is attracted to the solenoid 36 against the force of the spring 35 so that fuel intake 32 and the fuel outlet 33 communicate.

Consequently, when no electric current is running to the solenoid 36, the high pressure chamber 29a and the low pressure chamber 29b are completely cut off from each other and when an electric current is running to the solenoid 36, the high pressure chamber 29a and the low pressure chamber 29b communicate, to reduce the pressure in the high pressure chamber 29a. As the pressure in the high pressure chamber 29a is reduced, the timer piston 27 moves to the position where it is in balance with the force of the timer spring 30 to change the injection timing.

In fact, the pressure in the high pressure chamber 29a is adjusted through duty ratio control of the timing control valve. This duty ratio is controlled by the control unit 41 (shown in FIG. 1)and when the duty ratio is at 0%, the timing control valve 31 is in the full open state and the injection timing is at its most delayed angle. When the duty ratio is at 100%, the timing control valve 31 is in the full closed state and the injection timing is at its most advanced angle.

Also, a timer position sensor 37 for detecting the position of the timer piston is provided in the housing. This timer position sensor 37 may be located, for instance, toward the low pressure chamber and it is constituted with a detection coil 39 provided on the sensor main body 38 and a rod 40 mounted on the timer piston 27. An output signal TPSIST from the timer position sensor 37 is sent to the control unit 41 where it is processed.

The control unit 41 is structured with a drive circuit that drives the actuator 2 and the timing control valve 31, a microcomputer that controls the drive circuit, an input circuit for inputting signals to the microcomputer, and the like. The microcomputer is provided with a central processing unit (CPU), a ROM, a RAM, an A/D converter and the like. The engine rotation rate N (the output from the engine rotation rate sensor), the accelerator position signal ACCEL, which indicates the quantity of accelerator pedal movement, the water temperature signal TW, which indicates the temperature of the engine cooling water, and the like, as well as the signal TPSIST from the timer position sensor 37 are input to the input circuit of the control unit 41. These signals are processed and then used to drive and control the actuator 2 and the timing control valve 31 in conformance to a specific program.

Figure 3:
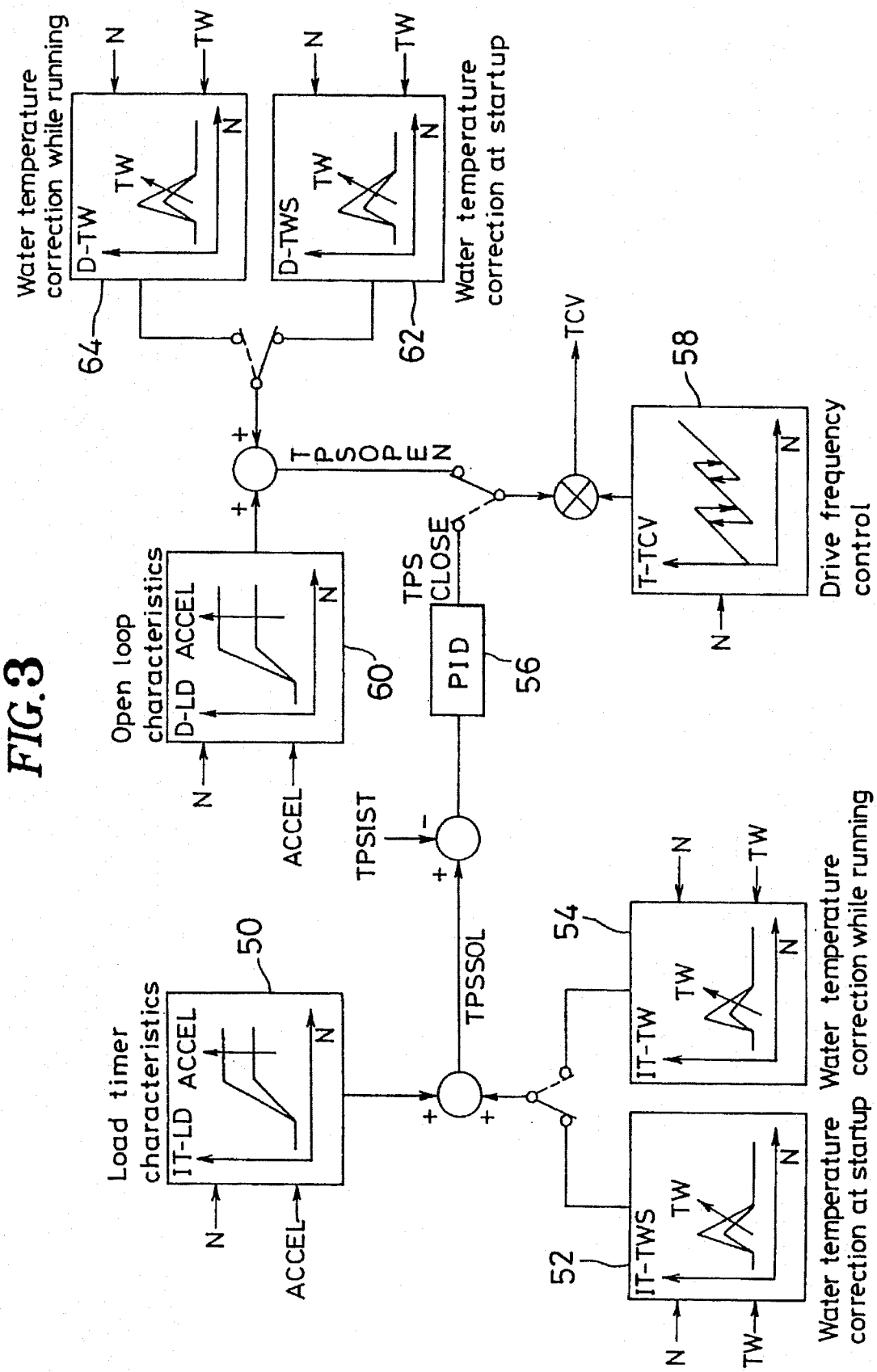
FIG. 3 is a schematic diagram of an example of fuel injection timing control.

In FIG. 3, an example of timer control performed by the control unit 41 is shown in a block diagram. To give a brief explanation of this, the optimal injection timing (IT_LD), which corresponds to a given set of operating conditions, is calculated using a data map (load timer characteristics) of the optimal injection timing, which is determined in advance based upon the engine rotation rate N and the accelerator position ACCEL. Then the timer piston position that corresponds to the optimal injection timing is calculated (block 50). If the operation is at startup (start mode), an injection timing correction quantity for startup that corresponds to the set of operating conditions is determined from the data of the injection timing correction quantity (IT_TWS) that have been mapped in advance based upon the relationship between the engine rotation rate N and the water temperature TW, and the correction quantity for the timer piston position that corresponds to the injection timing correction quantity is calculated (block 52). If it is during normal running, an injection timing correction quantity for running that corresponds to the set of operating conditions is determined from the data of the injection timing correction quantity (IT_TW) that have been mapped in advance based upon the relationship between the engine rotation rate N and the water temperature TW, and the correction quantity for the timer piston position that corresponds to the injection timing correction quantity is calculated (block 54). Then, the timer piston position (TPSSOL: target timer piston position) which achieves the target injection timing is calculated by adding the correction quantity calculated in block 52 or block 54 to the timer piston position calculated in block 50. After this, the difference between the target timer piston position (TPSSOL) and the measured timer piston position (TPSIST: actual timer piston position) is determined and the adjustment quantity (TPSCLOSE), with which PID control is performed to keep this difference within a specific range is calculated (block 56). Then, a drive pulse which corresponds to the adjustment quantity is output to the TCV (block 58).

In contrast to the control performed during normal running described above, when there is any type of error, the injection timing (D_LD) that corresponds to a given set of operating conditions is calculated using a specific data map (open loop characteristics) based upon the engine rotation rate N and the accelerator position ACCEL and then the timer piston position that corresponds to this injection timing is calculated (block 60). If the operation is at startup (start mode), an injection timing correction quantity for startup that corresponds to the set of operating conditions is determined from the data of the water temperature correction quantity (D_TWS) that have been mapped in advance, based upon the relationship between the engine rotation rate N and the water temperature TW, and a correction quantity for the timer piston position that corresponds to that injection timing correction quantity is calculated (block 62). If it is during normal running, a correction quantity for running that corresponds to the set of operating conditions is determined from the data of the injection timing correction quantity (D_TW) that have been mapped in advance based upon the relationship between the engine rotation rate N and the water temperature TW, and the correction quantity for the timer piston position that corresponds to the injection timing correction quantity is determined (block 64). Then, the control quantity (TPSOPEN) for the timer piston position in open loop control is calculated by adding the correction quantity calculated in either block 62 or block 64 to the timer piston position calculated in block 60. After this, a drive pulse which corresponds to this control quantity is output to the TCV (block 58).

Figure 4:
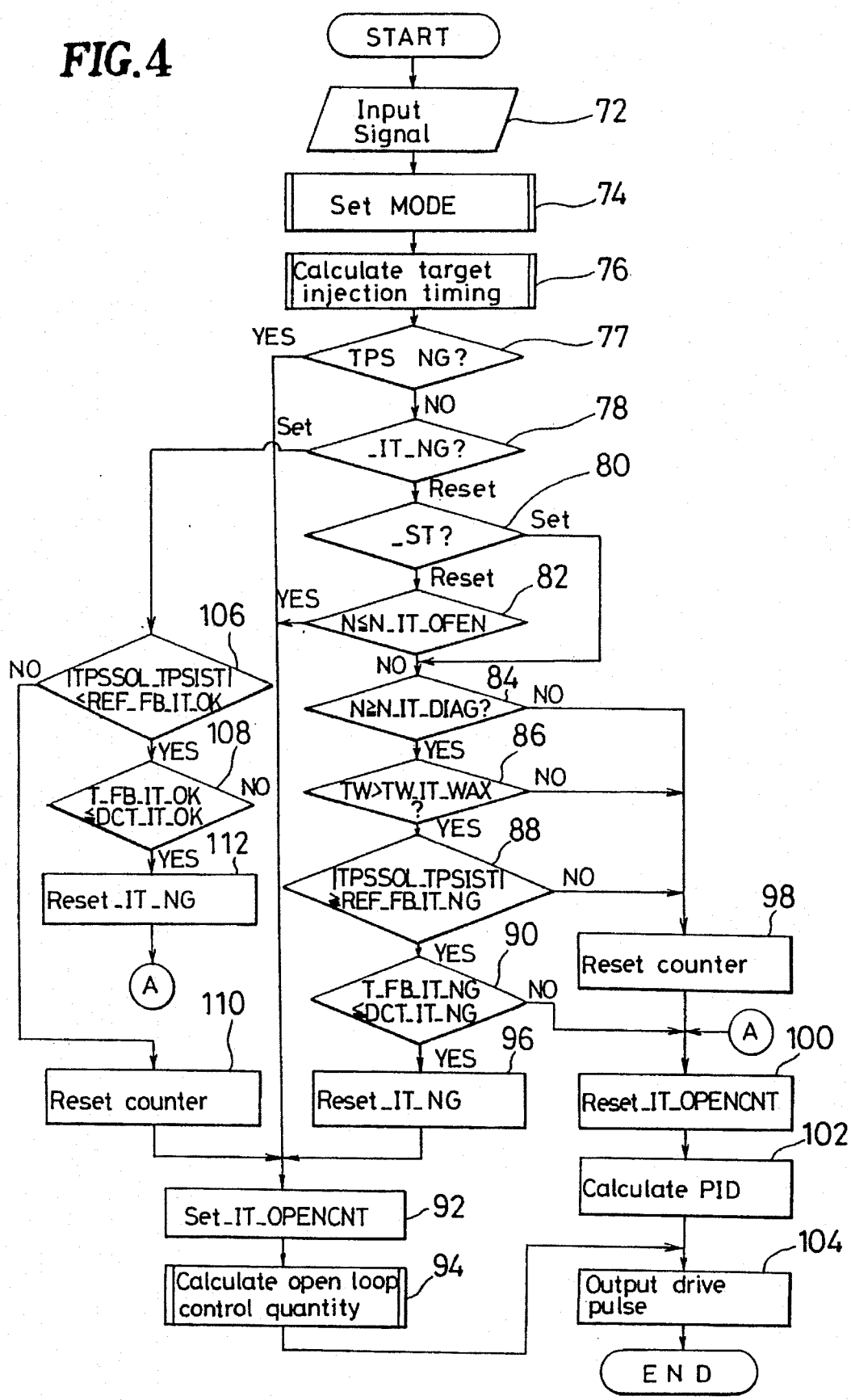
FIG. 4 is a flow chart showing an example of fuel injection timing control performed by the control unit.

FIG. 4 is a flow chart of a more specific example of control and the following is its explanation. The control unit 41 is initialized when the start switch (ST SW) is turned ON and analog signals from the various sensors of the injection pump 1, including an output signal (TPSIST) from the timer position sensor 37, the engine rotation rate (N), the accelerator position signal (ACCEL) and the water temperature signal (TW), are sequentially converted into digital signals by the A/D converter to be input to the control unit 41 (step 72).

Next, in step 74, the mode setting processing described below is executed and then in step 76, the processing for calculating the target injection timing is executed.

Figure 5:
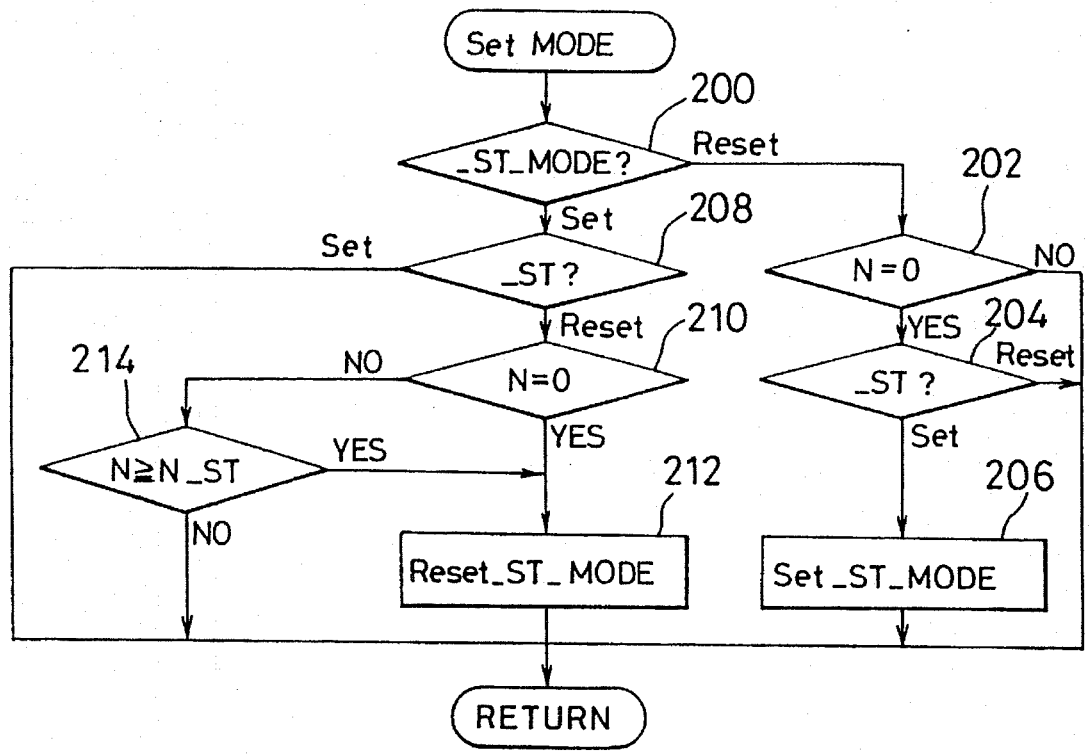
FIG. 5 is a flow chart of a specific example of mode setting processing in step 74 of the processing shown in FIG. 4.

As shown in FIG. 5, in the mode setting processing, a decision is made in step 200 as to whether or not the flag (_ST_MODE) for indicating that the operation is in start mode is in effect. If the _ST_MODE has been reset, a decision is made in step 202 as to whether or not the engine rotation rate N is 0. Also, a decision is made in step 204 as to whether or not the flag (_ST) for indicating that the engine start switch has been turned ON is set. This flag (_ST) is set when the start switch (ST SW) is operated and is reset before and after it is operated. Since the engine is not running when the flag (_ST_MODE) is in the reset state and when the start switch is turned ON, control processing for the start mode is required, and the flag (_ST_MODE) is set in step 206. If the engine has already been started with the flag (_ST_MODE) reset, or if the start switch is not being operated, the _ST_MODE is left in the reset state.

In contrast, if it has been decided in step 200 that the flag (_ST_MODE) is set, a decision is made in step 208 as to whether or not the flag (_ST) is set and also a decision is made in step 210 as to whether or not the engine rotation rate N is 0. If the engine rotation rate becomes 0 after the start switch has been operated, the operation proceeds to step 212 in which the flag (_ST_MODE) is reset. If, on the other hand, the engine rotation rate is not 0 after the start switch has been operated, then the operation proceeds to step 214, in which a decision is made as to whether or not the engine rotation rate N is equal to or exceeds a specific rotation rate (N_ST: 650 rpm, for instance). Since, if the engine rotation rate N is equal to or exceeds the specific rotation rate (N_ST), the operation may be switched from the control processing for the start mode to the control processing for the normal running mode, the flag (_ST_MODE) is reset. However, if N_ST>N r 0, the control processing for the start mode is maintained.

Figure 6:
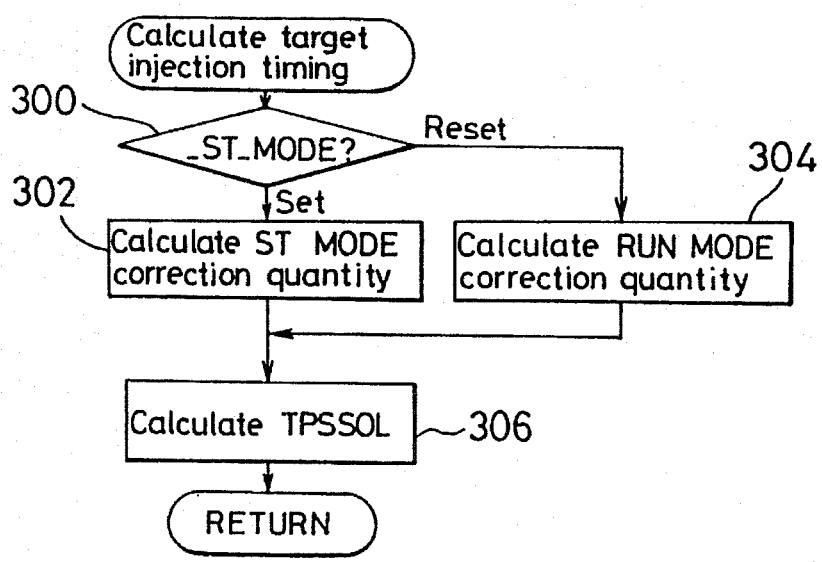
FIG. 6 is a flow chart showing an example of calculation processing for target injection timing in step 76 of the processing shown in FIG. 4.

Next, back in FIG. 4, the calculation for the target injection timing performed in step 76 is carried out, as shown in FIG. 6, by first making a decision in step 300 as to whether or not the flag (_ST_MODE,) for indicating that the start mode is in effect. If the flag (_ST_MODE) is set, the operation proceeds to step 302, in which a correction quantity for injection timing in the start mode is calculated. At this point, the injection timing correction quantity for the start mode is calculated by storing in advance the correct injection timing correction quantities relative to the engine rotation rates N and the temperatures TW of the engine cooling water in the ROM as a data map and by using this data map with the input of N and TW, as explained earlier.

If the flag (_ST_MODE) has been reset, the operation proceeds to step 304, in which an injection timing correction quantity for the normal running mode is calculated. The injection timing correction quantity for the normal running mode, too, is calculated by storing in advance the injection timing correction quantities for the running state in ROM as a data map and by using this data map with the input of N and TW.

After this, the operation proceeds to step 306, in which the optimal target injection timing relative to the engine state at that point, is calculated as a target timer piston position (TPSSOL), by taking into consideration the correction quantity described above, in the manner described earlier.

When the processing described so far is completed, a decision is made in step 77 as to whether or not there is an error in the timer position sensor (TPS). Also, in step 78 a decision is made as to whether or not the injection timing control disable flag (_IT_NG) for indicating that the control for the injection timing is disabled has been set. Then, in order to ascertain the state of the starter and engine rotation rate, a decision is made in step 80 as to whether or not the starter motor has been turned ON (the ST SW has been turned ON) to set the flag (_ST), and in step 82, a decision is made as to whether or not the engine rotation rate N is equal to or less than a specific rotation rate (N_IT_OPEN: 400 rpm, for instance) that requires open loop control of the injection timing.

If the starter is engaged or if, after the startup of the starter, the engine rotation rate exceeds the specific rotation rate (N_IT_OPEN), the operation proceeds to step 84. However, if the engine rotation rate is equal to or less than the specific rotation rate (N_IT_OPEN) after the starter has been operated, the operation proceeds to step 92 in which the open loop control flag (_IT_OPENCNT) for indicating that open loop control is to be executed for the injection timing is set. In step 94 that follows, the open loop control quantity is calculated.

In step 84, a decision is made as to whether or not the engine rotation rate N is equal to or exceeds a required specific rotation rate (N_IT_DIAG: 650 rpm, for instance) for detecting an injection timing servo error, and then in step 86, a decision is made as to whether or not the water temperature TW exceeds a required specific water temperature (TW_IT_WAX: −5° C., for instance) for detecting an injection timing servo error. In step 88, a decision is made as to whether or not the difference ( |TPSSOL-TPSIST| ) between the target timer piston position and the actual timer piston position is equal to or exceeds a specific quantity (REF_FB_IT_NG: 2 mm, for instance) for deciding that the injection timing servo control is disabled, and in step 90, a decision is made as to whether or not the count on the timer counter (DCT_IT_NG) is equal to or exceeds a specific length of time (T_FB_IT_NG: 5 sec, for instance).

If it has been decided in step 77 that there is an error in the TPS, the operation proceeds to step 92, in which the open loop control flag (_IT_OPENCNT) for indicating that open loop control of the injection timing is to be performed is set and in step 94, the open loop control quantity is calculated.

Even when there is no error in the TPS, if it has been decided in steps 80 and 82 that the engine rotation rate N is equal to or exceeds the N_IT_DIAG, that the water temperature TW exceeds the TW_IT_WAX, that the |TPSSOL-TPSIST| is equal to or exceeds the REF_FB_IT_NG and that the count on the timer counter (DCT_IT_NG) after the start of counting is equal to or exceeds the specific length of time (T_FB_IT_NG), it is determined that an error has occurred in the timing device control system and the operation proceeds to step 96, in which the injection timing control disable flag (_IT_NG) is set before shifting to step 92 explained earlier.

In relation to the conditions for determining that injection timing control is disabled (steps 84–90), if the engine rotation rate N falls short of the rotation rate (N_IT_DIAG) required for determining that there is an error in the timing device control system, if the water temperature TW is equal to or less than the TW_IT_WAX, or if the |TPSSOL-TPSIST| is smaller than the REF_FB_IT_NG, the operation proceeds to step 90 without deciding that there is an error in the timing device control system. In step 98, the timer counter is reset and in step 100, the open loop control flag (_IT_OPENCNT) is reset. In addition, if the count on the timer counter (DCT_IT_NG) does not reach the specific length of time (T_FB_IT_NG), the operation proceeds directly to step 100, to reset the open loop control flag (_IT_OPENCNT). Then, in step 102, the adjustment quantity (TPSCLOSE) with which PID control is performed to keep the difference between the target timer piston position (TPSSOL) and the actual timer piston position (TPSIST) within a specific range is calculated, and in step 104, and a drive pulse that corresponds to the adjustment quantity is output to the TCV 31.

Figure 7:
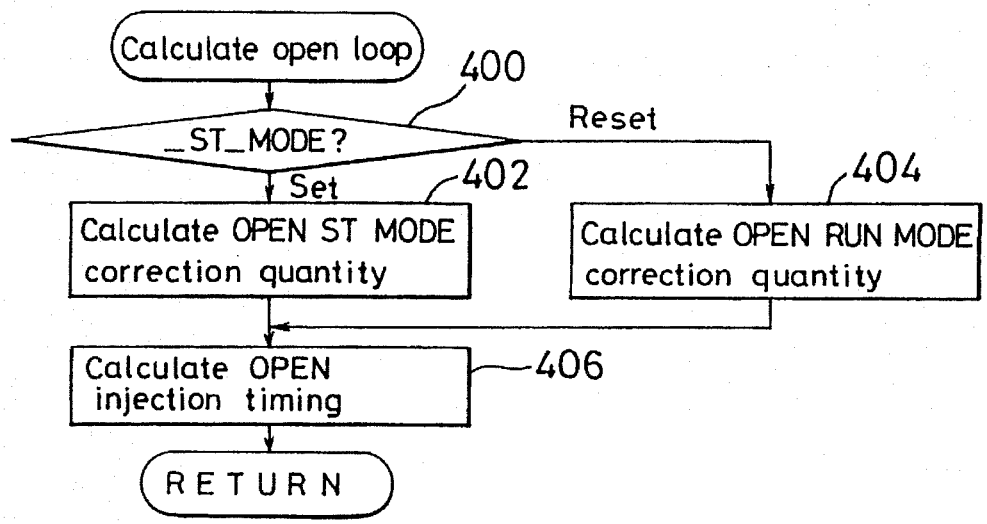
FIG. 7 is a flow chart showing an example of control quantity calculation for the open loop performed in step 94, of the processing shown in FIG. 4.

The open loop control performed in step 94 is explained below in reference to FIG. 7. In step 400, a decision is made as to whether or not the flag (_ST_MODE) for indicating that the start mode is in effect has been set and if the flag (_ST_MODE) has been set, the operation proceeds to step 402. If it has been reset, the operation proceeds to step 404.

In step 402, the injection timing correction quantity for the start mode in open loop control is calculated. At this point, the injection timing correction quantity for the start mode is calculated by storing in advance the correct injection timing correction quantities relative to the engine rotation rates N and the temperatures TW of the engine cooling water in ROM as a data map and by using this data map with the input of N and TW as explained earlier. Also, in step 404, the injection timing correction quantity in the normal running mode in open loop control is calculated. The injection timing correction quantity in the normal running mode, too, is calculated by storing in advance the injection timing correction quantities for the running state in ROM as a data map and by using this data map with the input of N and TW.

After this, the operation proceeds to step 406 in which the optimal target injection timing relative to the engine state at that point in time is calculated as the control quantity (TPSOPEN) for the timer piston position by taking into consideration the correction quantity described above, in the manner described earlier.

Then, after the control quantity is calculated in step 94, the operation proceeds to step 104 in which a drive pulse that corresponds to the control quantity is output to the TCV 31.

Now, if it has been decided in step 78 that the injection timing control disable flag (_IT_NG) has been set, the operation proceeds to steps 106 and 108, in which a decision for returning the operation from open loop control to feedback control of the injection timing is made. In other words, in step 106, a decision is made as to whether or not the |TPSSOL-TPSIST| is smaller than a specific return decision value (REF_FB_IT_OK: 2 mm, for instance) and in step 108, a decision is made as to whether the count on the timer counter for deciding that the injection timing servo is recoverable (DCT_IT_OK) is equal to or exceeds a specific time length (T_FB_IT_OK:5 seconds, for instance).

If, in step 106, it has been decided that the |TPSSOL-TPSIST| is equal to or exceeds the REF_FB_IT_OK, or if it has been decided in step 108 that the count on the timer counter (DCT_IT_OK) is less than the T_FB_IT_OK even though the |TPSSOL-TPSIST| is less than the REF_FB_IT_OK, the switch to feedback control of the injection timing will not be made. Therefore, the operation proceeds to step 92 from step 106 via the reset processing for the timer counter (step 110) or directly from step 108.

In contrast, if the conditions in steps 106 and 108 are satisfied, the operation proceeds to step 112, in which the injection timing control disable flag (_IT_NG) is reset before proceeding to the processing performed in step 100 and beyond, to return to feedback control.

Figure 8A:
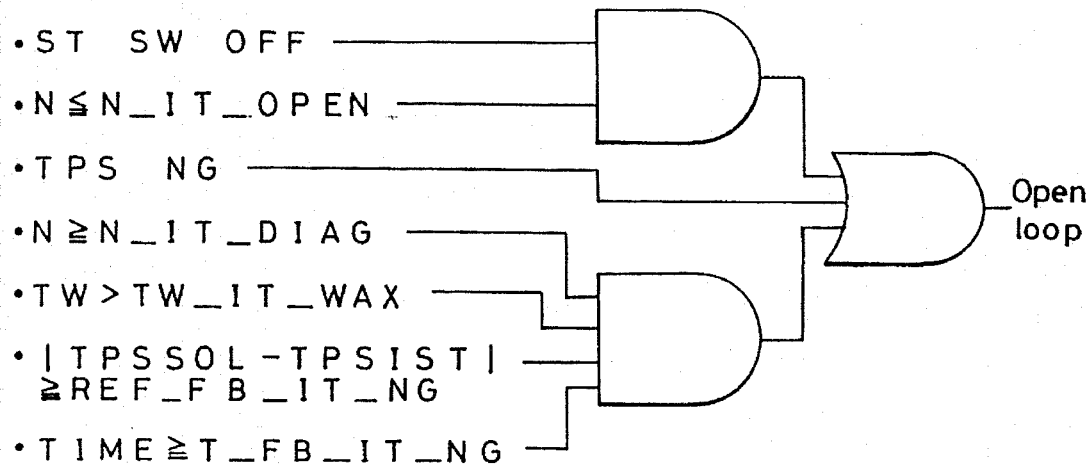
FIG. 8A is a logic diagram showing the decision making for switching from feedback control to open loop control and FIG. 8B is a logic diagram showing the decision making for switching from open loop control to feedback control.

To summarize the processing described so far, as shown in FIG. 8A, the operation shifts from feedback control to open loop control when (1) the switch (ST SW) for engaging the starter is OFF (after the operation of the starter at the time of startup is complete) and the engine rotation rate is equal to or less than the specific rotation rate (N_IT_OPEN), (2) there is an error in the timer position sensor or (3) the engine rotation rate N is equal to or exceeds the specific rotation rate (N_IT_DAIG), the water temperature TW is higher than the specific temperature (TW_IT_WAX), the difference between the target timer piston position and the actual timer piston position is greater than the specific quantity and all these conditions are maintained for a period equal to or exceeding a specific length of time (5 seconds).

Figure 8B:
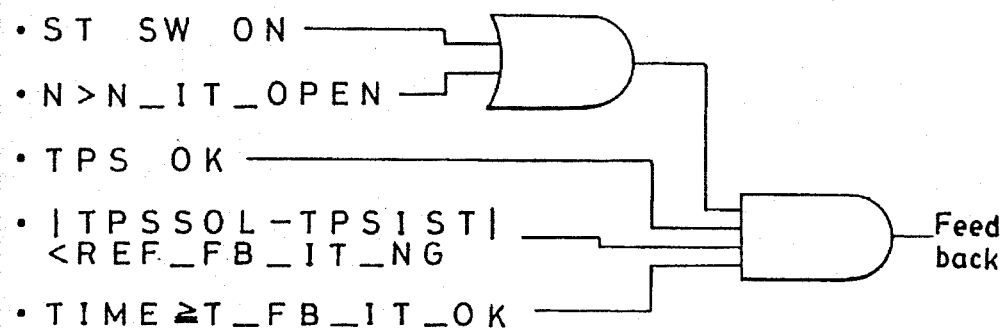

Also, as shown in FIG. 8B, the operation shifts from open loop control to feedback control when either the switch for engaging the starter is turned ON or the engine rotation rate exceeds the specific rotation rate, the timer position sensor is operating normally, the difference between the target timer piston position and the actual timer piston position is smaller than the specific quantity and these conditions are maintained for at least a specific length of time (5 seconds).

Figure 9:
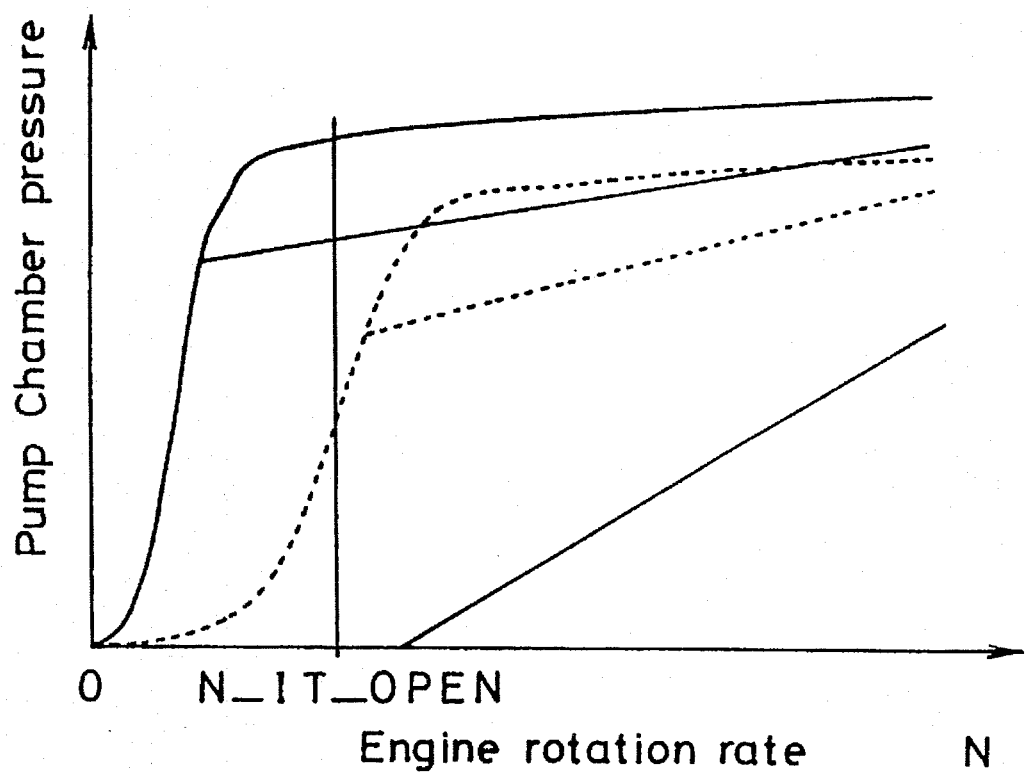
FIG. 9 is a graph showing the characteristics of the pump chamber pressure relative to the engine rotation rate.

Consequently, as indicated with the solid line in FIG. 9, if the pump chamber pressure is set at a high level, feedback control of the injection timing is possible at startup even in the extremely low rotation rate range. Thus, according to the present invention, as the operation shifts from step 80 to step 84 even when the engine rotation rate N at startup is less than the N_IT_OPEN, the operation does not shift to open loop control in the extremely low rotation rate range at startup and feedback control is maintained. As a result, according to the present invention, since, even when the output level of the engine rotation rate sensor is too low to be recognized by the control unit at extremely low rotation rates, i.e., even when the control accuracy is degraded, if a decision for switching to open loop control is implemented with the output from the engine rotation rate sensor, feedback control, in which the TPSIST conforms to the TPSSOL is maintained, and it is possible to improve control accuracy at startup. In addition, since feedback control is assured even in the rotation rate range that is equal to or less than the N_IT_OPEN at startup, anti-pollution measures can be accommodated. After such feedback control is performed at startup and the engine rotation has temporarily increased, if for some reason the engine rotation rate becomes equal to or less than the N_IT_OPEN, the operation shifts from step 82 to step 92 and open loop control is performed.

Note that since the operation shifts from step 86 to step 98 if the water temperature falls so low as to induce the fuel to become semi-solid, feedback control is continued in this case, too, without deciding that there is an error in the timing device control system, and the heat in the solenoid 36 generated by supplying an electric current to the TCV is passed on to the fuel in the fuel passages leading to the housing of the injection pump and the TCV, thereby eliminating the semi-solidification of the fuel at an early stage. In addition, although when the temperature is low and semi-solidification occurs, error decision making for the timing device control system in steps 88 and 90 is not performed, if the temperature reaches the range that terminates the semi-solidification, error decision making for the timing device control system (steps 88, 90) is performed in a normal manner. Thus, if there is an error in the timing device control system, the operation shifts to open loop control. Even if an error occurs in the timing device control system with the temperature at a low enough level to cause semi-solidification of the fuel, since the temperature that causes such semi-solidification is extremely low, it will exceed the threshold value in step 86 quickly as long as the control described above is performed after engine startup, and there is no problem in performing error decision making for the timing device control system after semi-solidification is eliminated.

As has been explained, according to the present invention, when a fuel injection system with the pump chamber pressure characteristics indicated by the solid line in FIG. 9 is used, since feedback control is maintained at low rotation rates at startup without deciding that there is an error in the injection timing device (timing device control system), the control accuracy for the injection timing at startup is improved and, at the same time, anti-pollution measures are facilitated.

What is claimed is;

1. An injection timing device for a fuel injection system comprising;

a timing device that adjusts the fuel injection start timing by causing the pressure of fuel in a pump chamber to work on a timer piston and adjusting said pressure working on said timer piston, a means for timer position detection for detecting the actual position of said timer piston, a means for timer target position setting for setting a target position for said timer piston, a means for feedback control for performing feedback control of said timing device in such a manner that said actual position of said timer piston approaches said target position, a means for engine rotation rate decision making for deciding that the engine rotation rate is equal to or less than a specific rotation rate, a means for open loop control for performing open loop control of said timing device when said means for engine rotation rate decision making has determined that said engine rotation rate is equal to or less than a specific rotation rate, a means for startup decision making for determining that the operation is at startup time, and a means for control that cancels the decision making by said means for engine rotation rate decision making and maintains said feedback control, when it is determined by said means for startup time decision making that the operation is in at startup time.

2. An injection timing device for a fuel injection system according to claim 1 wherein;

in said timing device, said timer piston is provided housed in a cylinder in such a manner that it can slide freely, said timer piston is linked to a roller holder with which a cam disk for defining the movement of a plunger is in contact via a roller and said roller holder is rotated with the sliding motion of said timer piston, and at one end of said timer piston, a high pressure chamber is formed, into which high pressure fuel is induced from said pump chamber, and at another end, a low pressure chamber is formed, which communicates with an intake path of a feed pump and which is provided with a timer spring, and the pressure in said high pressure chamber is adjusted with a timing control valve in such a manner that the required timer advance angle can be achieved and said timer piston stops at a position where the force of said pressure in said high pressure chamber and the force of said timer spring are in balance.

3. An injection timing device for a fuel injection system according to claim 1 wherein;

said means for timer position detection is constituted of a rod mounted to said timer piston and a detection coil into which said rod is inserted.

4. An injection timing device for a fuel injection system according to claim 1 wherein;

said means for timer target position setting calculates a timer piston position that corresponds to the optimal injection timing based upon the engine rotation rate and the accelerator position and obtains a target position for said timer piston by adding a correction quantity for said timer piston position that corresponds to said engine rotation rate and the water temperature to said timer piston position.

5. An injection timing device for a fuel injection system according to claim 1 wherein;

said means for feedback control determines the difference between said target position for said timer piston set by said means for timer target position setting and a timer piston position that is actually measured by said means for timer position detection, and performs PID control of said timer based upon said difference.

6. An injection timing device for a fuel injection system according to claim 1 wherein;

a specific rotation rate used by said means for engine rotation rate decision making is 400 rpm.

7. An injection timing device for a fuel injection system according to claim 1 further comprising;

a means for timing device control system error decision making for deciding that an error has occurred in a timing device control system wherein;

instead of what is described in claim 1, said means for control cancels the decision making performed by said means for engine rotation rate decision making when it has been decided by said means for startup decision making that the operation is at startup time and maintains said feedback control if it has been decided by said means for timing device control system error decision making that there is no error.

8. An injection timing device for a fuel injection system according to claim 7 wherein;

in said timing device, said timer piston is provided housed in a cylinder in such a manner that it can slide freely, said timer piston is linked to a roller holder with which a cam disk for defining the movement of a plunger is in contact via a roller and said roller holder is rotated with the sliding motion of said timer piston, and at one end of said timer piston, a high pressure chamber is formed, into which high pressure fuel is induced from said pump chamber, and at another end, a low pressure chamber is formed, which communicates with an intake path of a feed pump and which is provided with a timer spring, and the pressure in said high pressure chamber is adjusted with a timing control valve in such a manner that the required timer advance angle can be achieved and said timer piston stops at a position where the force of said pressure in said high pressure chamber and the force of said timer spring are in balance.

9. An injection timing device for a fuel injection system according to claim 7 wherein;

said means for timer position detection is constituted of a rod mounted to said timer piston and a detection coil into which said rod is inserted.

10. An injection timing device for a fuel injection system according to claim 7 wherein;

said means for timer target position setting calculates a timer piston position that corresponds to the optimal injection timing based upon the engine rotation rate and the accelerator position and obtains a target position for said timer piston by adding a correction quantity for said timer piston position that corresponds to said engine rotation rate and the water temperature to said timer piston position.

11. An injection timing device for a fuel injection system according to claim 7 wherein;

said means for feedback control determines the difference between said target position for said timer piston set by said means for timer target position setting and a timer piston position that is actually measured by said means for timer position detection, and performs PID control of said timer based upon said difference.

12. An injection timing device for a fuel injection system according to claim 7 wherein;

a specific rotation rate used by said means for engine rotation rate decision making is 400 rpm.

13. An injection timing device for a fuel injection system according to claim 1 further comprising;

a means for timing device control system error decision making for deciding that an error has occurred in said timing device control system wherein;

instead of what is described in claim 1, said means for open loop control performs open loop control of said timer when it has been decided by said means for timing device control system error decision making that an error has occurred or when it has been decided by said means for engine rotation rate decision making that the engine rotation rate is equal to or less than a specific rotation rate, and instead of what is described in claim 1, said means for control cancels the decision making performed by said means for engine rotation rate decision making and maintains said feedback control when it has been decided by said means for timing device control system error decision making that there is no error, and it has been decided by said means for startup decision making that the operation is at startup time.

14. An injection timing device for a fuel injection system according to claim 13 wherein;

in said timing device, said timer piston is provided housed in a cylinder in such a manner that it can slide freely, said timer piston is linked to a roller holder with which a cam disk for defining the movement of a plunger is in contact via a roller and said roller holder is rotated with the sliding motion of said timer piston, and at one end of said timer piston, a high pressure chamber is formed, into which high pressure fuel is induced from said pump chamber, and at another end, a low pressure chamber is formed, which communicates with an intake path of a feed pump and which is provided with a timer spring, and the pressure in said high pressure chamber is adjusted with a timing control valve in such a manner that the required timer advance angle can be achieved and said timer piston stops at a position where the force of said pressure in said high pressure chamber and the force of said timer spring are in balance.

15. An injection timing device for a fuel injection system according to claim 13 wherein;

said means for timer position detection is constituted of a rod mounted to said timer piston and a detection coil into which said rod is inserted.

16. An injection timing device for a fuel injection system according to claim 13 wherein;

said means for timer target position setting calculates a timer piston position that corresponds to the optimal injection timing based upon the engine rotation rate and the accelerator position and obtains a target position for said timer piston by adding a correction quantity for said timer piston position that corresponds to said engine rotation rate and the water temperature to said timer piston position.

17. An injection timing device for a fuel injection system according to claim 13 wherein;

said means for feedback control determines the difference between said target position for said timer piston set by said means for timer target position setting and a timer piston position that is actually measured by said means for timer position detection, and performs PID control of said timer based upon said difference.

18. An injection timing device for a fuel injection system according to claim 13 wherein;

a specific rotation rate used by said means for engine rotation rate decision making is 400 rpm.

19. An injection timing device for a fuel injection system according to claim 1 further comprising;

a means for timing device control system error decision making, for deciding that an error has occurred in a timing device control system, and a means for positional error decision making for deciding whether or not there is an error in said means for timer position detection wherein;

instead of what is described in claim 1, said means for open loop control performs open loop control of said timer when it has been decided by said means for positional error decision making that an error has occurred, when it has been decided by said means for timing device control system error decision making that an error has occurred or when it has been decided by said means for engine rotation rate decision making that the engine rotation rate is equal to or less than a specific rotation rate, and instead of what is described in claim 1, said means for control cancels the decision making performed by said means for engine rotation rate decision making and maintains said feedback control when it has been decided by said means for positional error decision making that there is no error, it has been decided by said means for timing device control system error decision making that there is no error and it has been decided by said means for startup decision making that the operation is at startup time.

20. A method for controlling injection timing by using a fuel injection system comprising;

a timing device that adjusts the fuel injection start timing by causing the pressure of the fuel in a pump chamber to work on a timer piston and adjusting said pressure working on said timer piston, a timer position detector for detecting the actual position of said timer piston, and a control unit that performs feedback control of said timing device in such a manner that said actual position of said timer piston approaches a target position, based upon the output of said timer position detector, wherein;

the operation shifts from feedback control to open loop control of said timing device when said fuel injection system is not at startup time and the engine rotation rate is equal to or less than a specific rotation rate, and when said fuel injection system is at startup time, feedback control of said timing device is maintained regardless of the engine rotation rate.

\* \* \* \* \*